United States Patent [19]
Moliard

[11] 3,863,365
[45] Feb. 4, 1975

[54] STAR FINDER

[76] Inventor: Henry Moliard, 942 Avenida Central, Guadalupe, Costa Rica

[22] Filed: Jan. 21, 1974

[21] Appl. No.: 434,818

[30] Foreign Application Priority Data
Jan. 25, 1973 France .............................. 73.02617

[52] U.S. Cl. ...................................................... 35/44
[51] Int. Cl. ........................................... G09b 27/04
[58] Field of Search .................................. 35/44, 43

[56] References Cited
UNITED STATES PATENTS

| | | | |
|---|---|---|---|
| 615,098 | 11/1898 | Nichols | 35/44 |
| 832,527 | 10/1906 | Barritt | 35/44 |
| 1,873,595 | 8/1932 | Johnson | 35/44 |
| 2,755,565 | 7/1956 | Alkema | 35/44 |
| 2,921,386 | 1/1960 | Stefano | 35/44 |
| 3,003,258 | 10/1961 | Stefano | 35/44 |

Primary Examiner—Wm. H. Grieb
Attorney, Agent, or Firm—Hill, Gross, Simpson, Van Santen, Steadman, Chiara & Simpson

[57] ABSTRACT

A star finding device comprised of a rectangular base folded along a mid-point axis normal to its longitudinal axis such that two adjacent panels result, each having an outer side for a hemisphere. Printed on both opposite edges, parallel to the longitudinal axis of the base is a scale of latitude. An horary dial representing the 24 hours of a day is centrally located on each of said panels having within said dial a space to receive a disk map of the constellations of the corresponding hemisphere. Each said disk pictorially represents the celestial bodies of a hemisphere and has along the circumferential edges thereof a scale representing the days of the year with a center pivot point corresponding to the pole of that hemisphere. A slidably mounted windowed strip mounted on each panel, whereby a pictorial representation of the celestial bodies is isolated within the windowed portion of the strip provided for each panel. After a disk pictorial representation of a hemisphere is placed on its corresponding panel, the time and date scales are adjusted such that the desired time and date of the observation are adjacent one another and the windowed strip is adjusted to the latitude from which the observation is to be made, a pictorial representation of the selected celestial vault will appear isolated within the windowed portion of the windowed strip. A numerical reference number is given to each constellation pictorially represented on a constellation map, whereby the name of a constellation may be obtained by consulting a list of constellations along with their numerical reference numbers printed on the back side of each panel.

21 Claims, 3 Drawing Figures

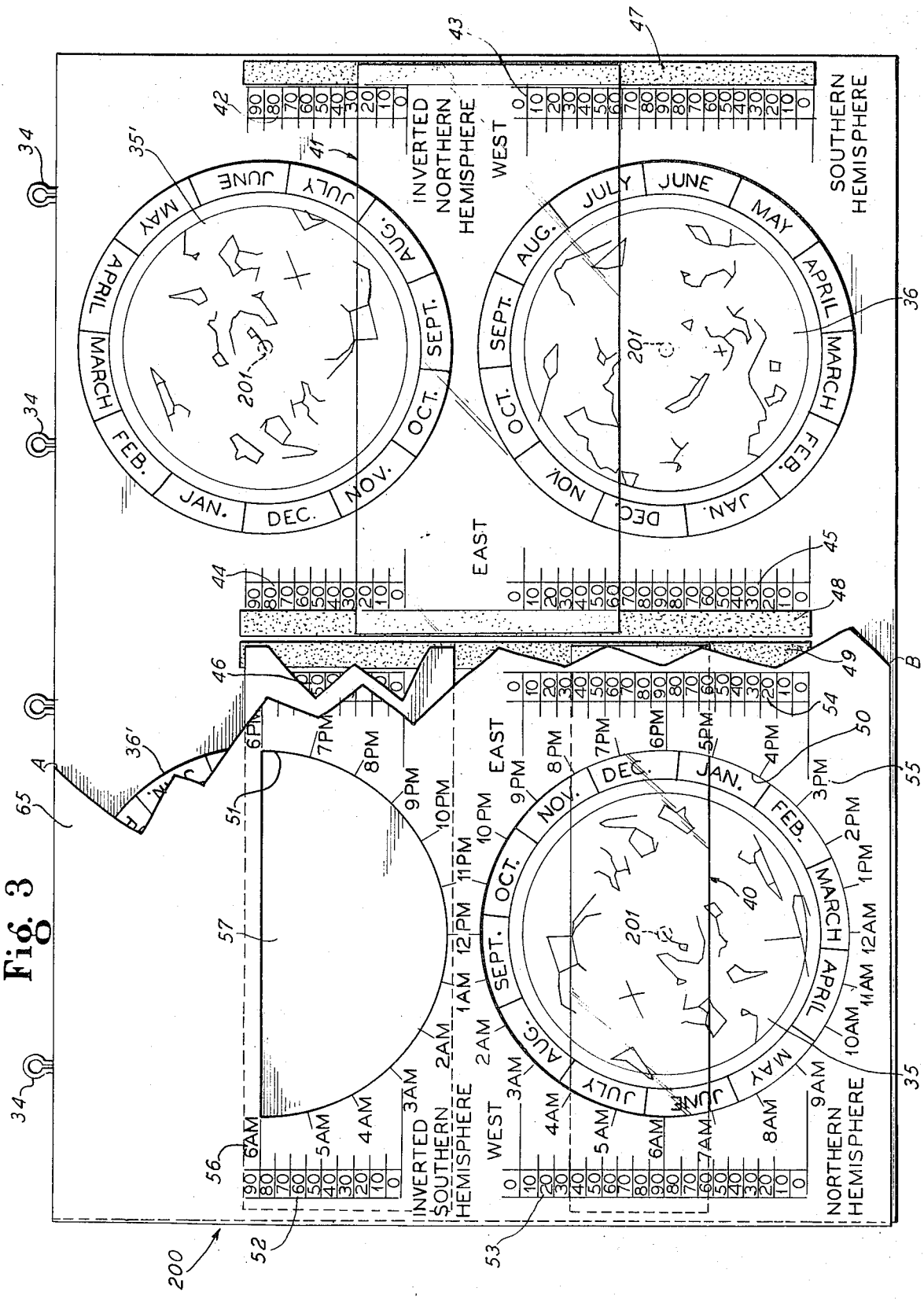

STAR FINDER

BACKGROUND OF THE INVENTION

1. Field of the Invention

The present invention relates to an astronomical device and more particularly to an improved star finder operable to pictorially represent the celestial bodies as they would appear to an earthbound observer from any latitudinal position at any given time and date.

2. Description of the Prior Art

A wide variety of star finding devices are recognized in the prior art for pictorially representing a selected portion of the celestial bodies. Star finding devices as heretofore existed were generally of a complicated construction having a plurality of disks cooperating with each other to define maps and scales for determining the desired information. Some prior devices were also limited as to the range of latitudes which could be chosen on a single disk and required the user to first select a disk having a latitudinal range corresponding to that within which he wished to make his observation.

Because of the rather involved technique required to operate, as well as the generally complicated construction or design, previous star finding devices were not readily useable by an observer, not previously familiar with the device, wishing to make only a quick, casual observation.

SUMMARY OF THE INVENTION

The primary object of this invention is to provide a star finder for locating the relative positions of the various celestial bodies.

The particular object of the present invention is to provide a new and improved star finder permitting a casual, first-time user to quickly comprehend the workings of the device.

Another object of the invention is to provide a new and improved star finder that can be easily and quickly adjusted to a particular time, date and latitude to indicate the position of the celestial bodies at any particular moment.

Another object of this invention is to provide a star finder which is of a compact and simple construction, having a minimum number of parts, which is economical to manufacture and can be readily assembled and disassembled and, in operation, has a high degree of accuracy.

Another object of the invention is to provide a star finder wherein the pictorial representations of various celestial configurations are quickly ascertainable and presented with great clarity.

Another object of the invention is to provide a star finder that is capable of representing the celestial bodies from all latitudes, including the equatorial regions.

Another object of the invention is to provide a star finder that is capable of withstanding a permanent outdoor environment.

A star finder for pictorially representing the celestial bodies as they would appear to an earthbound observer at a given time, date and latitude, according to the present invention, comprises a flat rectangular base folded along a mid-point axis normal to its longitudinal axis forming two panels of equal size having the side of each panel formed from the same base side adjacent to one another operable to permit the selective folding and unfolding of the base, a disk-shaped pictorial representation of the constellations of each hemisphere, a windowed strip-shaped latitudinal marker for each panel, and a transparent cover protecting the entire assembly from outdoor exposure. Each panel is provided with a horary dial having represented the 24 hours of a day centrally located on the outer sides of the folded base constructed to receive the disk of the corresponding hemisphere, and a latitudinal scale corresponding to the latitudes of the earth located along edges parallel to the longitudinal axis of the base. Each disk, the diameter of which equals that of the horary dial, has pictorially represented the celestial bodies corresponding to the hemisphere represented with each major celestial formation numerically referenced to a legend located on the inner adjacent panels of the folded base. A scale representing the months and days thereon of a year is located along the circumferential edges of each disk. Each windowed strip latitudinal marker is of a length greater than the width of the base permitting the excess length to form a folded-over portion at either end operable to hold the strip in place on a panel. The windowed portion of the marker is of a transparent material to centralize the desired celestial representation after the strip has been placed at a selected latitude and the date scale on the disk and the time on the horary dial are opposite one another for a desired time and date.

Another embodiment of the invention is shown having two identical bases side-by-side in a single plane having one base inverted. This configuration of the invention is intended to represent the entire global view of the celestrial bodies on a single plane looking both North and South, suitable for hanging on a wall.

BRIEF DESCRIPTION OF THE DRAWINGS

Other objects, features and advantages of the invention, together with its organization, construction and operation will be best understood from the following detailed description of the preferred embodiments of the invention, taken in conjunction with the accompanying drawings, on which:

FIG. 3 is a pictorial representation of an alternative embodiment of the star finder having an adjacent pair of base plates, one being inverted on a common plane constructed in accordance with the present invention.

DESCRIPTION OF THE PREFERRED EMBODIMENTS

Figure 1:
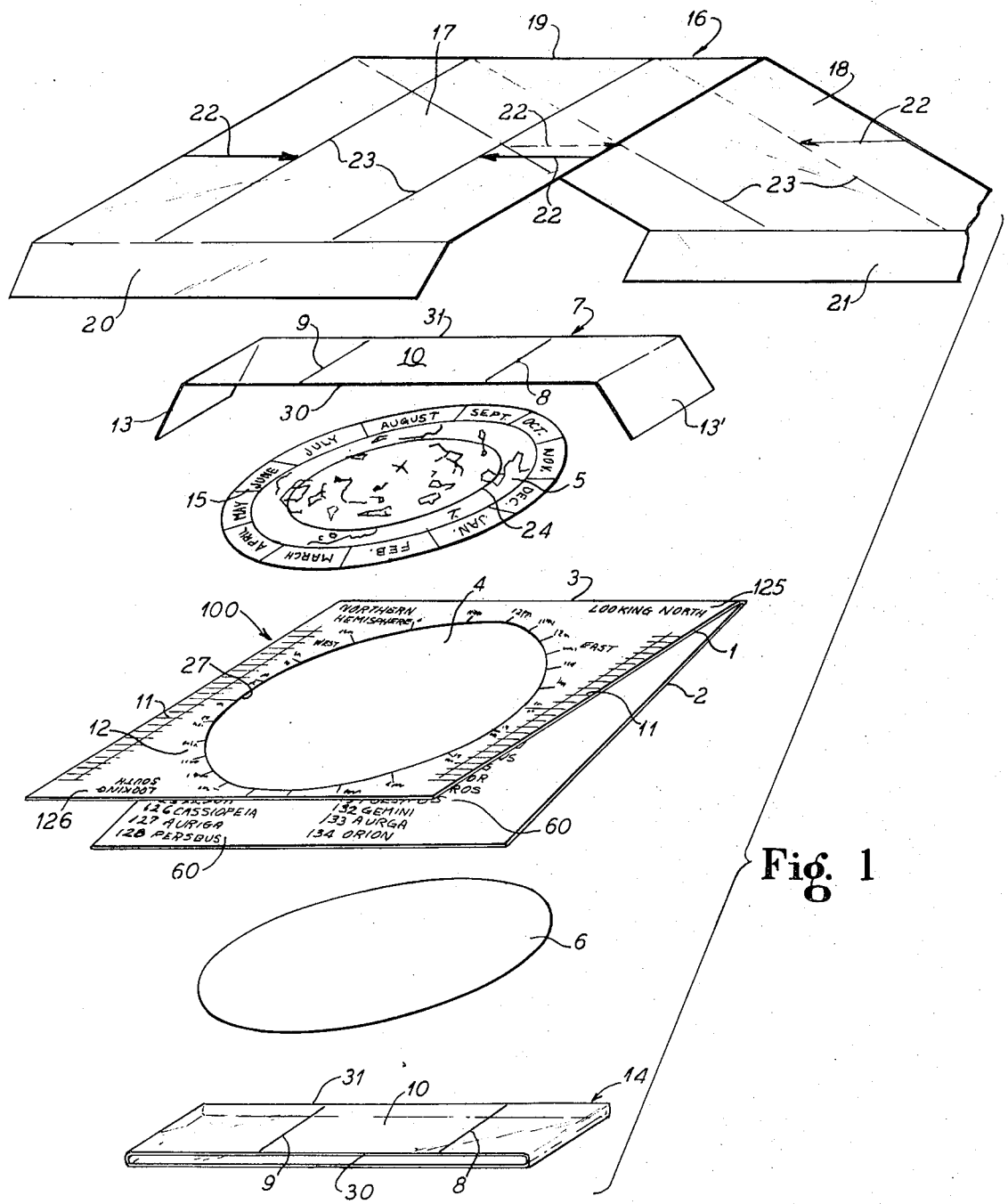
FIG. 1 is a pictorial exploded view of a star finder constructed in accordance with the present invention.

FIG. 1 shows a star finder constructed in accordance with the present invention which is intended to be used outdoors and which I shall refer to as a "Field Kit." It is composed of a base 100, composed itself of two panels 1 and 2, attached together along an edge 3 which can be folded closed or opened along the edge 3, bringing one panel above the other in an inverted position. Each panel has a circular area such as that indicated as 4 on panel 1, intended to receive a map constellation of a hemisphere having the pole of the hemisphere as the center. In FIG. 1, the panel 1 will receive and hold the map 5 of the Northern hemisphere and the panel 2 will receive and hold the map 6 of the Southern hemisphere, only the back side of which is shown. The maps may be held in position on their respective panels by a shallow circular aperture 27 located within each horary dial 12. Each map is covered and also held in place by a strip of transparent material having a windowed area 10. A strip 7 will cover the map 5 of the Northern hemisphere and a strip 14 will cover the map 6 of the Southern hemisphere. Both strips have in their center a windowed portion 10, the purpose of which is to frame up on the maps the selected celestial vault desired by an observer. The strip 7 is provided with flaps 13 and 13', which fold under the panel 1, allowing the windowed strip to slide along the panel 1 in a close relationship thereto.

The panels 1 and 2 have printed on the left and right sides of the maps 5 and 6 a scale of latitude 11, the degrees of which correspond exactly to the degrees of latitude on the maps 5 and 6. In this manner, the windows 7 and 14 are movable and can be brought in line with any of the degrees of the scale 11 and thereby frame up on the maps 5 and 6 the sky visible at that latitude.

Another form has been given to the strip 14. Instead of being provided with the flaps 13 and 13', it has the form of a muffle in which the panel 2 or 1 will be introduced, and along which the window will be able to slide.

The panels 1 and 2 have printed on each an horary dial 12 which includes the 24 hours of the day and forms a space 4 on each panel in which the maps 5 and 6 will be placed. On the horary dial, the 12 P.M. mark is located near the edge 3 on each panel on the longitudinal axis of the base 100 on which also lies the center of the space 4 which is where the pole of the map will be when the map is placed in the space 4 and the 6 P.M. mark is located in front of the Eastern border of the panels which is its right side on the panel of the Northern hemisphere, and its left side on the panel of the Southern hemisphere, and the 6 A.M. mark is in front of their Western sides, the left one in the panel of the Northern hemisphere and the right one on the panel of the Southern hemisphere, and both marks are horizontally in line with the center of the space 4 which is where the poles of the maps will be when they are placed on the space 4.

Along the circumferential edges of the maps 5 and 6 is printed a scale 15 representing the twelve months of the year with a selected number of dates within each month, the name of each month being in front of the sector of the map where are shown the principal constellations visible during that month.

Once the map is placed in the space 4, the user can, by rotating it around its pole, bring any date of the map in front of any of the hours of the horary dial and in this position, the map will show the position of the celestial vault at that date and at that hour, that is, at that moment.

The scales of latitude 11 printed along the left and right borders of the panels 1 and 2 have the same number of degrees as have the maps, the space between each degree exactly the same as on the maps and the 90° point of the scale is exactly in line with the center of the space 4 representing the pole of a hemisphere. Thus, also in line with the 6 P.M. and the 6 A.M. marks on the horary dial 12 of the panel.

The space 10 of the movable windowed strips 7 and 14 is formed by two horizontal lines 30 and 31 and two vertical lines 8 and 9, printed on the strip of transparent material. This space 10 is what forms the frame of the window. The horizontal lines 30 and 31 represent also the upper and lower edge of the strips 7 and 14, which is of a length sufficient to reach and cover the scales of latitude 11 of the panels 1 and 2, once the window is placed on the panel on top of the maps. The distance between the lines 30 and 31 is exactly equal to the distance which on the maps represents 90°, thus also representing 90° on the scales of latitude. Therefore, the line 31 corresponds to the zenith of the observer and the line 30 to his front horizon when he looks toward the pole of a hemisphere. The distance between the lines 8 and 9 is equal to the distance which on the map covers 180°, distributed 90° on either side of the center of the space 10, which is the point which will always be in line with the pole of the map when the strip 7 or 14 is placed on a panel. The lines 8 and 9 will, therefore, be in line with the Eastern and Western extremities of the equatorial circle of the map and will thereby mark the observer's Eastern and Western horizons.

The combined use of the maps with the horary dials of the panels and with the movable windows makes it possible to obtain on the map the representation of the constellations visible in the sky at any moment of the year and at any latitude. The user first localizes on the maps 5 and 6 the date of his observation. Second, by revolving the map around its pole, the user brings the date of his observation, adjacent to the hour of his observation on the horary dial 12 of panel 1 or 2. By sliding the movable window to bring its upper edge, which represents the user's zenith, in line on the scale of latitudes, with the degree of the latitude under which he stands or which he desires to study, there will appear within the windowed frame, the sky visible to him, between his zenith and his horizon, at that date, at that hour and at that latitude.

For observations at latitudes above 45°, be it North or South, the user will have to use only the map of the hemisphere on which he stands or which he desires to study, and he must, therefore, place both windows on that map, the upper edge of one against the lower edge of the other, with the line formed by these two edges aligned on the scales of latitude with the degree of the latitude the user is studying. This line will always be his zenith both when he is looking North and when he is looking South. When he is looking toward the pole of the hemisphere opposite to the one in which he stands, he will have to turn the base plate upside down, to help him to ascertain whether he is holding the base and the maps correctly, the two legends: "Looking North" 125 and "Looking South" 126 are printed respectively on the upper right corner and on the lower left corner of each panel.

FIG. 1 illustrates the base 100 covered by a protective screen 16, the purpose of which is to protect the maps, the windows and the panels from the weather as well as to hold the maps and windows in place. Said screen 16 is made of transparent flexible material so that it does not interfere with the consultation of the maps and of the scales. It is composed of two panels 17 and 18, attached along an edge 19, which cover the panels 1 and 2 of the base 100. The free ends of the panels of the screen are provided with the flaps 20 and 21 which fold under the panels 1 and 2 of the base and are squeezed between them, thus maintaining all the elements of the device in place. Panels 17 and 18 of the screen may have printed thereon vertical lines 23 which are in alignment with the equatorial circle of the maps and, outside of these lines 23, are traced the two horizontal lines 22 which are in line with the center of the space 4 of the panels 1 and 2, aligned with the pole of each map. The purpose of these lines is to help the user to see whether the maps are correctly placed on the panels.

The use of a base, as in this invention, of two panels attached along the edge 3 which can be opened vertically, permits the identification of constellations by numbers only without their names, and to make the consultation to a list of constellation names 60 printed on the reverse side of the panels, easy and simple. Such maps are necessarily much clearer than those where the names are printed and, therefore, makes their consultation much easier. FIG. 1 illustrates on the back of panel 2 of the Southern hemisphere a list 60 wherein the names of the constellations of the Northern hemisphere are listed along with their numerical reference numbers. In this manner, when the user consults the map 5 of the Northern hemisphere and wants to know the name of a constellation, he has only to note the number identifying it and to lift the panel 1 of said hemisphere and consult the list 60 in which the name of that constellation appears. Similarly, the list of the names of the constellations of the map 6 of the Southern hemisphere is printed in the back of the panel 1 of the Northern hemisphere.

Figure 2:
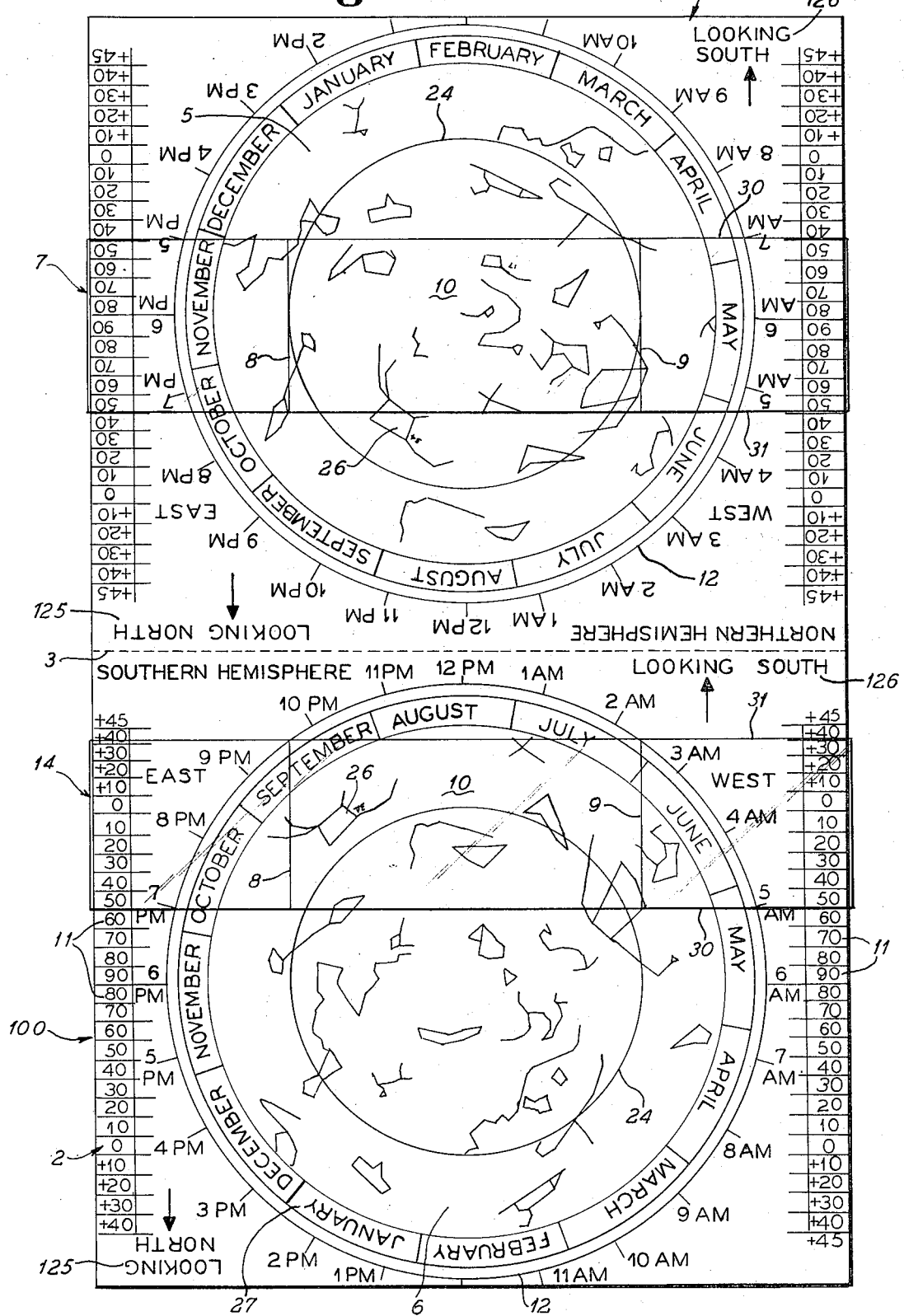
FIG. 2 is a pictorial plan view of the base plane outer surface illustrating the panels for each hemisphere adjacent one another in a common plane, each having thereon the corresponding constellation map and a windowed latitude marker, constructed in accordance with the present invention.

FIG. 2 represents the base 100 with the panels 1 and 2 opened in order to show more clearly the disposition and the working of its various elements. It shows also how the invention permits a user to verify on the maps the correct position of a constellation which may, in certain cases, appear on the map being consulted in a position different than the one it occupies in the heavens, a fact which may greatly confuse the observer. In FIG. 2, the "Field Kit" has been set to show the sky visible on the 15th of August at 12 P.M. at latitude 40° North. Note that it could be also for an observation at any other date and hour visible within the windows, for instance, on September 21st at 9 P.M. The maps 5 and 6 have been set on both panels 1 and 2 with the date 15th of August in front of the mark 12 P.M. of the horary dials 12 and the movable windows 7 and 14 have been placed with their upper borders in line with 40° North on the scales of latitude 11, that is: in line with 40° latitude on the scale on panel 1 of the Northern hemisphere, resulting in the horizon of the observer at the 50° mark on the other side of the pole. On the panel 2 of the Southern hemisphere, the upper border of the window has been placed in line with the +40° mark on the scale of latitude, which, on that map, belongs to the group of latitudes of the Northern hemisphere, resulting in the horizon of the observer at 50° South, where it is when observer looks southward. Normally, in this case the user would, to observe the sky, keep the two panels 1 and 2 folded and consult the maps of the Northern hemisphere and then of the Southern hemisphere individually, but for a reason we are going to see presently, he has opened the panels to verify the correct position of a constellation.

The maps employed in this star finder are subject, like all maps, to a certain distortion which in this case becomes greatest in the parts of the map beyond the equatorial circle 24. This distortion combined with the rotational movement experienced by a map, may cause the constellations on the map being consulted to appear within the frame of the windowed strip in one of its upper or lower corners and outside the equatorial circle of the map, resulting in a representation of a constellation in a position different than the one it occupies in the sky. In such cases, by opening the two panels, the user can see on the map which is now in an inverted position above the one being consulted, the constellation he is looking for in its correct position.

FIG. 2 gives an example of such a situation. The user was consulting the skies and the map 6 of the Southern hemisphere. He had difficulties in recognizing in the sky the constellation 26 of Pegasus which is visible on the map at the left upper corner of the window 14, outside of the equatorial circle 24, pointing in an upward direction. In doubt, the observer opened the two panels 1 and 2, bringing both panel 1 and map 5 of the Northern hemisphere in an inverted position above map 6 of the Southern hemisphere. There the observer can see the constellation 26 of Pegasus, which is outside the frame of the window but within the equatorial circle 24 of the map, appearing in a position pointing downward, the opposite of how it is visible on the map 6 of the Southern hemisphere, this downwardly pointing position illustrating the constellation as it appears in the sky. Without the possibility of placing the two maps one above the other in an inverted position, it would be extremely difficult, in cases such as the one illustrated, to find and to recognize the constellation in the heavens and only a base with two panels opening vertically offers such capability.

FIG. 3 shows another embodiment of the invention, in the form of a "Mural Tableau" suitable for hanging on a wall by eyelets 34, where in one picture a global view of the sky, both Northern and Southern, visible to an observer at any moment of the year and at any latitude is represented in a single plane. It is based on the same principles as the "Field Kit" and works in the same manner. The tableau is the equivalent of two "Field Kits" opened and placed, one turned upside down alongside of the other.

Looking at FIG. 3, the tableau is composed of a board 200 on which are mounted four maps of the Northern and Southern hemispheres, fixed to the board at their poles by a pin means 201 permitting each map to be rotated around its pole. The maps are disposed as shown in the figure: On the right side of the board the map 36 of the Southern hemisphere is mounted with above it the map 35' of the Northern hemisphere in an inverted position and in an inverted form. On the left side, the map 35 of the Northern hemisphere is mounted alongside the map 36 of the Southern hemisphere, with above it the map 36' of the Southern hemisphere in an inverted position and in an inverted form. Of this last map, only a part is visible in the upper section of the tableau, because it is covered by the opaque screen 65. On the left and right sides of each map are printed: the scales of latitude 43 and 45 on both sides of map 36 and scales 42 and 44 on both sides of map 35'. The same scales of latitude are also printed on both sides of the maps mounted on the left side of the tableau. Of these, only part of the scale of latitude 46 of map 46' is visible, the others are covered by the screen 65. The degrees of latitude of these scales correspond exactly to the degrees of latitude of the maps having the 90° mark horizontally in line with poles of the maps.

Over the maps are placed movable windows similar to the windowed strips in FIG. 1, which in this case are shown by the window 40 over map 35 of the Northern hemisphere and on the right side of the tableau, the window 41 over both maps 36 of the Southern hemisphere and 35' of the Northern hemisphere inverted. Said windows are made of transparent material such as plastic and they serve to frame up on the maps a space which vertically corresponds to 90° on the maps and on the scales of latitude and corresponds horizontally to 180° of such degrees, distributed 90° on each side of the center of the window, which will always be in line with the poles of the maps, as do the windows of the "Field Kit."

The window 40 covers the map 35 of the Northern hemisphere, which is the hemisphere being studied. For this reason, it is of the standard size. The distance between its upper and its lower edges is equal to 90° of the latitude of the maps. In contrast, the window 41 had to cover in part the two maps 36 of the Southern hemisphere and 35' of the Northern hemisphere inverted which had to be used to study the Southern sky, that is, part of the Northern sky together with part of the Southern sky, and the distance between its upper and lower edges is greater than that of window 40, equalling 90° of the latitudes of the maps plus the distance between the equatorial circles of the two maps 36 and 35'.

In both windows 40 and 41, the distance between the left and right borders of the frame is equal to 180° of latitude on the maps.

These windows are movable and can be placed in alignment with anyone of the degrees on the scales of latitude and thereby frame up on the maps the sky visible to an observer at that latitude. They can be attached to the board in a mobile way by means such as pegs, hooks or preferably by the use of adhesive bands such as bands 47 and 48 on the left and right sides of the maps 36 and 35', on the right side of the tableau, and band 49 on its left side. The counterpart of adhesive band 49 is hidden by the screen 65. These means for holding the movable windows are disposed on the board at the required places and with the required distance between one band and its counterpart so that the center of the window they support will always be vertically in line with the pole of the map it covers.

The whole tableau, that is, the board, the maps and the windows, are covered by an opaque screen 65 which, in the figure, has been cut along the line A–B in order to illustrate on the right side of the tableau the working of the maps and of its various elements. Said screen has four openings such as 50 and 51 on the left side of the tableau, each of the size required to expose the part of the maps showing the constellations and the months. Each side of said openings have the scales of latitude printed on the board, such as scales 53,54 and 52 on the opaque screen 65, with the same dimensions and positions with respect to the maps, and printed around each one of said openings in an horary dial, such as 55 and 56 with the 24 hours of the day in which the 12 P.M. mark is vertically above the poles of the two maps fixed along the lower part of the tableau.

In FIG. 3, the tableau has been set to show the sky visible for instance on the 21st of September at 12 P.M. at latitude 30° North. For that purpose, the movable windows have been placed with their upper borders in line with the degree 30 North of all the scales of latitude, that is: the upper edge of the window 40 in line with the scales of latitude 30° mark on either side of map 35 of the Northern hemisphere, which is the one being studied, and the upper edge of the window 41 in line with the 30° mark on the scales of latitude 42 and 44 which on the right side of the tableau, belong to the map 35' of the Northern hemisphere inverted. As explained before, the distance between the upper and lower edges of window 41 is equal to 90° of latitude of the map increased by the distance between the equatorial circles of the two maps 36 and 35', but the window still covers on the maps 90° of latitude, distributed 30° on map 35' and 60 degrees on map 36 of the Southern hemisphere. This is the kind of window which has to be used when the user investigates the sky looking toward the pole of the hemisphere opposite to the one on which he stands.

Inasmuch as for the study of the Northern sky, the inverted map 36' of the Southern hemisphere, on the left side of the tableau, is not consulted, it is covered by the blind window 57 to avoid confusion. Said blind window is of the same size as the regular mobile window and is provided with the same fixing means so that it may be placed on any of the maps when they are not in use.

Although the present invention has been described by reference to particular illustrative embodiments thereof, the illustrations and descriptions have only been provided as non-limiting examples. Many changes and modifications of the invention may become apparent to those skilled in the art without departing from the spirit and scope of the invention. It is, therefore, intended that the patent warranted hereon cover all such changes and modifications as may reasonably and properly be included within the scope of the contribution to the art.

I claim as my invention:

1. A device for quickly and easily pictorially representing stars as they would appear from earth at any selected latitude and at any selected time and date which comprises a flat base providing two panels, each panel having scales of latitude along the sides thereof and a central circular twenty-four hour scale, a circular disk for each panel surrounded by said circular scale and rotatable relative to said panel, each disk having circumferentially arranged indicia designating the months of the year and the days of each month arranged so that a selected date may be aligned with a selected hour on the surrounding hour scale, one disk having indicia surrounded by the circumferential indicia representing the principal star constellations of the Northern hemisphere, the other disk having indicia surrounded by the circumferential indicia representing principal star constellations of the Southern hemisphere, slides overlying the panels and their disks shiftable along the length of the longitudinal scale on the panel and having a window overlying and isolating a portion of the disk on the panel, and said scale of latitude, said scale of hours, said circumferential scale of dates and said constellation indicia being correlated so that alignment of the slide with a selected latitude on the scale of latitudes and rotation of the disk to align a selected date with a selected hour will expose in the window the principal star constellations that would appear to an observer at the selected latitude and at the selected date and time.

2. The device of claim 1, wherein the base is foldable to provide two overlying panels.

3. The device of claim 1, wherein each panel has a circular aperture receiving the disk.

4. The device of claim 1, wherein the disk for the Northern hemisphere has a center locating the North Pole and the disk for the Southern hemisphere has a center locating the South Pole of the earth.

5. The device of claim 1, wherein each disk has circular indicia representing the equator and any star constellation exposed by the window beyond the equator is adapted to be properly oriented by aligning the slide overlying the disk for the other hemisphere at the same latitude.

6. The device of claim 1, wherein the slide is transparent and indicia on the slide isolates the boundaries for the window.

7. The device of claim 2, wherein the slide for each panel has a flap underlying the panel to mount the slide on the panel.

8. The device of claim 2, wherein each slide is an envelope surrounding the panel.

9. The device of claim 1, wherein the base is rectangular and the latitude scales are aligned along both side edges thereof.

10. The device of claim 9, wherein the rectangular base is foldable on a transverse center line.

11. The device of claim 1, wherein each circular 24 hour scale has indicia representing 12 P.M. located on the longitudinal axis of said flat base adjacent each other on either side of a midpoint axis of said flat base normal to said longitudinal axis.

12. The device of claim 1, wherein each slide when overlying a panel has indicia representing a central windowed portion bordered by a width distance corresponding to 90° on said scales of latitude and by a length distance corresponding to 180° on said scales of latitude.

13. The device of claim 1, wherein each said disk has indicia representing the contiguous principal constellations of the other hemisphere circumferentially arranged between said indicia designating the months of the year and the days of each month and said indicia designating the principal star constellations of the hemisphere of the disk.

14. The device of claim 1, wherein said disks have numerical indicia referencing the names of the principal constellations to a printed legend of the principal constellations carried on the reverse side of the opposite panel.

15. The device of claim 1, wherein a transparent cover overlies said flat base and is attached thereto.

16. The device of claim 15, wherein said transparent cover has indicia representing two parallel lines running tangentially to said circular indicia representing the equator on each disk on either side thereof and indicia relating to the indicia of 90° latitude on said scales of latitude.

17. A star finder device for the study of the skies from a selected latitude which comprises a flat base,
four sets of scales denoting latitude arranged in quadrants on the base,
a circumferentially arranged horary dial on the base in each quadrant between the scales of latitude for each quadrant,
a disk rotatably mounted on the base in each quadrant surrounded by the horary dial in the quadrant,
said latitude scales and disks being arranged in two superimposed pairs in side-by-side relation, a disk in each pair having indicia respectively showing star constellations for the Southern and Northern hemispheres in inverted relation to each other, and
a transparent slide overlying the base and disks to be aligned with a selected latitude on said scales and having an isolated window for exposing the star constellations of the disks visible at the selected latitude.

18. The device of claim 17, wherein the base has hangers for mounting on a wall.

19. The device of claim 17, wherein the base has grooves for mounting the slides and a retaining means operable to hold the slides in position.

20. The device of claim 17, wherein an opaque screen is attached to said flat base having four circular openings corresponding in size and location to the disks, each said opening having located circumferentially indicia designating the 24 hours of a day and indicia representing scales of latitude carrier vertically on said opaque screen on either side of each said opening.

21. The device of claim 17, wherein an opaque slide overlying the base and disk is provided whereby a disk not presently consulted may be covered.

* * * * *